United States Patent

Berets

[11] 3,843,232
[45] Oct. 22, 1974

[54] ELECTROCHROMIC LIGHT MODULATING DEVICES HAVING A PALLADIUM COUNTER ELECTRODE

[75] Inventor: Donald Joseph Berets, Stamford, Conn.

[73] Assignee: American Cyanamid Company, Stamford, Conn.

[22] Filed: Feb. 16, 1973

[21] Appl. No.: 333,254

[52] U.S. Cl. ............................................. 350/160 R
[51] Int. Cl. ................................................ G02f 1/36
[58] Field of Search ................................. 350/160 R

[56] References Cited
UNITED STATES PATENTS

| | | | |
|---|---|---|---|
| 3,578,843 | 5/1971 | Castellion | 350/160 R |
| 3,708,220 | 1/1973 | Meyers et al. | 350/160 R |

OTHER PUBLICATIONS

Van Nostrand's Scientific Encyclopedia, 4th Edition, Copyright 1968, D. Van Nostrand Co. Inc., pg. 1372

*Primary Examiner*—Vincent P. McGraw
*Attorney, Agent, or Firm*—Charles J. Fickey

[57] ABSTRACT

Electro-optical device useful in control of visible and infrared absorption by windows in homes, commercial buildings and the like, and for information display typically comprising in sandwiched arrangement a pair of electrodes, and a film of a transition metal compound and a liquid electrolyte disposed between the electrodes is provided, wherein the counter-electrode is palladium. The device exhibits coloration and bleaching thereof over large areas by control of the polarity of an applied electric field.

9 Claims, No Drawings

ELECTROCHROMIC LIGHT MODULATING DEVICES HAVING A PALLADIUM COUNTER ELECTRODE

BACKGROUND OF THE INVENTION

This invention relates to electro-optical devices and more particularly to devices whose electromagnetic radiation transmission characteristics can be selectively altered by the influence of a suitably controlled electric field. Still more particularly the invention is concerned with an electro-optical device in which an ion conducting medium is employed in a cell containing an electrochromic material of variable oxidation states, such as tungsten oxide or titanium dioxide.

In prior U.S. Applications, Ser. No. 530,086, filed Feb. 25, 1966; abandoned and refiled as Ser. No. 616,791, on Feb. 17, 1967, also abandoned and refiled as Ser. No. 110,068, on Jan. 27, 1971, also abandoned and refiled as Ser. No. 349,878, on Apr. 10, 1973; and Ser. Nos. 41,153 and 41,154 both filed May 25, 1970, both abandoned, and continuation-in-part applications thereof Ser. No. 211,857, filed on Aug. 28, 1967, now abandoned and refiled as Ser. No. 361,760, filed May 18, 1973; and U.S. Pat. No. 3,521,941, there are described electro-optical devices exhibiting a phenomenon known as persistent electrochromism. This term denotes the property of a material whereby its electromagnetic radiation absorption characteristic is altered, in most instances even at ambient temperature, under the influence of an electric field. Such materials, for example, may exhibit little or no absorption of visible wave lengths in the absence of an electric field and therefore be transparent, but when subjected to an electric field, effectively absorb in the red end of the spectrum, turning blue in color. Similar effects can be observed in other portions of the electromagnetic radiation spectrum, invisible as well as visible.

As described in the foregoing earlier applications, if an assembly is formed wherein a layer of a persistant electrochromic material is disposed between a pair of electrodes, across which a potential is applied, the radiation transmitting characteristic of the material will change. If the electrodes and the electrochromic layer are formed on the surface of a transparent substrate, such as glass, the light transmitting characteristics of the combination can be varied by controlling the electric field produced across the electrochromic layer. Thus, if the "sandwich" of electrodes and electrochromic material on the substrate originally is clear, i.e., presenting substantially no diminution of the light transmitting ability of the substrate, application of a voltage between the electrodes to establish an electric field of the proper polarity changes the light absorption characteristic of the electrochromic material, turning it darker, for example, thus decreasing the light transmitting ability of the entire assembly.

In addition, the prior electrode-electrochromic material sandwich devices included on additional layer of an ion conducting medium in contact with one of the electrodes and the elctrochromic material, the additional layer being of a material which can be characterized as either as ionic liquid electrolyte, which may include any inert thickening agaent or a current carrier permeable insulator, or both of these layers together. It has been found that when such a material is added to the prior device, not only does it permit the absorption characteristic of relatively large areas of the electrochromic material to change rapidly and uniformly under the influence of an electric field of a given polarity, even at ambient temperature, but it also renders the electrochromic layer sensitive to a field of the opposite polarity to return it positively to the absorption characteristic state it occupied prior to the initial application of the field, at a rate dependent upon the magnitude of the reverse field. In certain cases, the return to initial state may be effected at a relatively slow rate simply by providing a highly conductive, e.g., short circuit, path between the two electrodes.

The uniformity and area of coverage at which the coloration can be effected are improved in relation to the embodiments of the earlier applications and the present invention is thus suitable to a much wider range of use. Thus, the invention is applicable to mirrors, window glass, automobile windshields, and the like. The field of practical use is widened, moreover, by the low power required to induce or erase the new absorption characteristic and the discovery that the intensity of coloration is a function of current passed in this reversible cell.

In the prior art devices, various metallic-counter-electrodes were disclosed. It was further disclosed that the persistent electrochromic material could also be used as a counter-electrode.

A new and particularly advantageous counter-electrode material has now been found in the present invention. These are metals which will absorb and desorb hydrogen. Particularly suitable is palladium. This counter-electrode has the advantage that it is capable of binding protons and storing them as adsorbed hydrogen on the palladium. In addition, the palladium counter-electrode is relatively invisible through a transparent fluid electrolyte.

As used herein, a "persistent electrochromic material" is defined as a material responsive to the application of an electric field of a given polarity to change from a first persistent state in which it is essentially non-absorptive of electromagnetic radiation in a given wave length region, to a second persistent state in which it is absorptive of electromagnetic radiation in the given wave length region, and once in said second state, is responsive to the application of an electric field of the opposite polarity to return to its first state. Certain of such materials can also be responsive to a short circuiting condition, in the absence of an electric field, so as to return to the initial state.

By "persistent" is meant the ability of the material to remain in the absorptive state to which it is changed, after removal of the electric field, as distinguished from a substantially instantaneous reversion to the initial state, as in the case of the Franz-Keldysh effect.

DETAILED DESCRIPTION OF THE INVENTION

Electrochromic Materials

The materials which form the electrochromic materials of the device in general are electrical insulators or semi-conductors. Thus are excluded those metals, metal alloys, and other metal-containing compounds which are relatively good electrical conductors. These materials are fully disclosed in U.S. Pat. No. 3,521,941.

While not wholly understood, it appears that coloration of the electrochromic materials must be accompanied by the uptake of positive counterions provided in the electrolyte.

The persistent electrochromic materials are further characterized as inorganic substances which are solid under the conditions of use, whether as pure elements, alloys, or chemical compounds, containing at least one element of variable oxidation state, that is, at least one element of the Periodic System which can exist in more than one oxidation state in addition to zero. The term "oxidation state" as employed herein is defined in "Inorganic Chemistry," T.Moeller, John Wiley & Sons, Inc., New York, 1952. These include materials containing a transition metal element (including Lanthanide and Actinide series elements), and materials containing non-alkali metal elements such as copper. Preferred materials of this class are films of transition metal compounds in which the transition metal may exist in any oxidation state from +2 to +8. Examples of these are: transition metal oxides, transition metal oxysulfides, transition metal halides, selenides, tellurides, chromates, molybdates, tungstates, vanadates, niobates, tantalates, titanates, stannates, and the like. Particularly preferred are films of metal stannates, oxides and sulfide of the metals of Groups (IV)B, (V)B and (VI)B of the Periodic System, and Lanthanide series metal oxides and sulfides. Examples of such are copper stannate, tungsten oxide, cerium oxide, cobalt tungstate, metal molybdates, metal titanates, metal niobates, and the like.

An important advantage of devices of the invention containing a persistent electrochromic material is applicability to large uniformly colored areas. The invention, therefore, permits numerous practical applications where control of visible and infrared absorption is desired to which prior art electro-optical devices are not susceptible as for example, windows in homes, commercial buildings and automobiles.

When the persistent electrochromic materials are employed as films, thickness desirably will be in the range of from about 0.1 to 100 microns. However, since a small potential will provide an enormous field strength across very thin films, the latter, i.e., 0.1 to 10 microns, are preferred over thicker ones. Optimum thickness will also be determined by the nature of the particular compound being laid down as films and by the film-forming method since the particular compound and film-forming method may place physical (e.g., non-uniform film surface) and economic limitations on manufacture of the devices.

The films may be laid down on any substrate which, relative to the film, is electronically conductive, such as metals or semi-conducting materials. The electronically conductive material may be coated on another suitable substrate such as glass, wood, paper, plastics, plaster, and the like, including transparent, translucent, opaque or other optical quality materials. One embodiment in the instant device could employ at least one transparent electrode, for example NESA glass (i.e., glass coated with a layer of tin oxide).

When the electric field is applied between the electrodes, a blue coloration of the previously transparent sandwich occurs, i.e., the persistent electrochromic layer becomes absorptive of electromagnetic radiation over a band encompassing the red end of the visible spectrum, thereby rendering it bluish in appearance. Prior to the application of the electric field, it was essentially non-absorbent and thus transparent.

Ionic Conducting Medium: Electrolytes

When liquid electrolyte is employed, the electrolyte can comprise an acid or salts thereof which are compatible with a counter electrode as discussed below and the electrochromic layer, such as the following:

1. Aqueous sulfuric acid solutions ranging from 0.1 to 12.0 molar.
2. Sulfuric acids solutions of propylene carbonate, acetonitrile, dimethyl formamide and other organic solvents compatible with sulfuric acid.
3. Strong organic acids, such as 2-toluene sulfonic acid, in propylene carbonate and other organic solvents.
4. Alkali metal or alkaline earth metals or rare earth metal salts, such as lithium perchlorate, nitrate, chloride, sulfate, etc., in organic solvents, such as acetonitrile and propylene carbonate.

A distinct advantage of the above-mentioned solvents is their dielectric and solubility properties leading to high conductivity and high capacity.

Ionic Conducting Medium: Insulating Layer

Numerous well-known materials are suitable for use as current carrier permeable insulators in this invention. These include an air gap or vacuum gap, normally substantially non-conductive substances such as plastics, e.g., polyesters, vinyl or like polymers, allylic or like polymers, polycarbonates, phenolics, amino resins, polyamides, polyimides, cellulosic resins, and others whether solvent or water soluble or insoluble. Also included are metal oxides or sulfides prepared by oxidizing or sulfidizing a metal electrode surface such that the insulator is formed directly on the electrode. As example is the combination of an aluminum electrode and aluminum oxide insulator coating. Other such inorganic insulators contemplated are selenide, arsenide, nitride, chloride, fluoride, bromide and carbide films.

Where practicable and compatible with the electromagnetic material and electrodes, the insulator may be a fluid (liquid or gas), low melting solid, or solid or liquid mixture of two or more different insulating materials.

Three suitable insulators are silicon oxide, calcium fluoride and magnesium fluoride. Preferably the insulator is a film of at least about 0.001 microns thickness, for example, in the range of about 0.001 – 1.0 microns.

Counter Electrode

The cell of the instant disclosure employs a counter electrode in contact with the liquid electrolyte. The counter electrodes are materials which are capable of adsorbing and desorbing hydrogen, such as palladium.

The following examples illustrating a particular application of the present invention, are not to be construed as a limitation on the invention except as defined in the appended claims.

EXAMPLE 1

A film of tungsten oxide about 1.0 micron in thickness is vacuum-deposited on a carefully cleaned 12 × 12 inches conductive glass substrate (NESA glass). A gasket of insulating material about 3mm thick is then placed over the substrate around the sides of the film and incorporating on one side a palladium counterelectrode in contact with the electrolyte. The palladium electrode was previously treated by immersing in concentrated nitric acid, burning in a flame and then immersing for several hours in a 2N hydrochloric acid solution saturated with hydrogen. The cavity so formed is enclosed by a transparent glass cover plate in a sandwich type cell arrangement.

In order to color the tungsten oxide film in contact with the electrolyte the electrical leads to the cell are connected to an external power source. The palladium plate is made positive.

The coloration of the electrochromic film is achieved by applying to the electrochromic cell a potential of about 0.7 volt and current of 30 milliamperes. Rapid and even coloration of the electrochromic film occurs over the entire glass area, and is complete within 5 minutes. With the electric field removed from the cell, the electrochromic image is substantially permanent.

The window can be bleached completely within the same time interval by reversing the polarity of the applied potential.

EXAMPLE 2

A film of tungsten oxide 0.5 microns in thickness was employed in a 6 × 6 inches window cell containing 8 molar sulfuric acid of similar structure to that in Example 1. The electrochromic layer self colored under current to about 30 percent transmission in the center within 1 minute. The degree of coloration was easily controlled and the entire viewing area developed an even coloration. Upon reversing the polarity, thus making the electrochromic film positive, the colored film bleached completely with 3 minutes at a constant potential of 1 volt. The cell underwent 2,500 cycles over a period of 10 days. The film was still clear and performed well.

EXAMPLE 3

A device suitable for information display, constructed as in Example 2 and having an area of 2mm X 2mm was colored in about 1 second under the same conditions and bleached in the same time interval.

EXAMPLE 4

A device was constructed similar to that of Example 1 using a layer of molybdenum oxide instead of tungsten oxide. The device operated under the same conditions with similar coloration and bleach results.

We claim:

1. A variable light transmission device which comprises in combination an electrode, a persistent electrochromic material, and a palladium counter-electrode capable of sorbing and desorbing hydrogen.

2. The device of claim 1 wherein the electrochromic material contains at least one element of variable oxidation state.

3. The device of claim 1 wherein said persistent electrochromic material is tungsten oxide.

4. The device of claim 1 wherein said device contains an ion conductive medium between said electrochromic layer and said counter-electrode.

5. The device of claim 4 wherein the ion conductive medium is a strong sulfuric acid solution.

6. The device of claim 4 wherein the ion conductive medium is in coextensive contact with the electrochromic material.

7. The device of claim 1 wherein at least one of the electrodes is substantially transparent.

8. A device as in claim 7 wherein said counter electrode is positioned so that light may pass through at least part of said transparent electrode.

9. The device of claim 1 wherein said device has an insulating layer between said electrochromic layer and said counter-electrode.

* * * * *